(12) United States Patent
Miller

(10) Patent No.: US 7,229,677 B2
(45) Date of Patent: Jun. 12, 2007

(54) KNOCKDOWN CORRUGATED BOX FOR TEMPERATURE CONTROL AND METHOD OF MAKING

(75) Inventor: Drayton Miller, 3928 McGregor Ct., Mobile, AL (US) 36608

(73) Assignees: Drayton Miller, Mobile, AL (US); Martin Fleit, Miami, FL (US)

( * ) Notice: Subject to any disclaimer, the term of this patent is extended or adjusted under 35 U.S.C. 154(b) by 166 days.

(21) Appl. No.: 10/748,839

(22) Filed: Dec. 30, 2003

(65) Prior Publication Data

US 2005/0163947 A1 Jul. 28, 2005

(51) Int. Cl.
*A01G 5/00* (2006.01)
(52) U.S. Cl. .............. 428/34.2; 428/182; 428/183; 428/184; 428/185; 428/186; 206/423; 229/939
(58) Field of Classification Search .............. 428/34.2, 428/182, 183, 184, 185, 186; 206/423; 229/939, 229/929
See application file for complete search history.

(56) References Cited

U.S. PATENT DOCUMENTS 4,663,207 A * 5/1987 Kupersmit ................. 428/119
6,050,412 A * 4/2000 Clough et al. .............. 206/423

OTHER PUBLICATIONS

Dictionary of Paper, 5th edtion, Tappi Press, 1996 p. 24.*

* cited by examiner

*Primary Examiner*—Alicia Chevalier
(74) *Attorney, Agent, or Firm*—Martin Fleit; Paul D. Bianco; Fleit Kain Gibbons Gutman Bongini & Bianco P.L.

(57) ABSTRACT

A box for shipping temperature sensitive or perishable goods made from a double walled combined web having an inside barrier layer, a first paper liner bonded to the inside barrier layer, a first paper flute medium bonded to the first paper liner, an outside barrier layer, a second paper liner bonded to the outside barrier layer, a second paper flute medium bonded to the second paper liner, and a sandwich of a barrier layer bonded between third and fourth paper liners. The flute mediums are bonded, respectively, to the third and fourth paper liners.

5 Claims, 3 Drawing Sheets

KNOCKDOWN CORRUGATED BOX FOR TEMPERATURE CONTROL AND METHOD OF MAKING

BACKGROUND OF THE INVENTION

1. Field of the Invention

The present invention relates to a knockdown corrugated box for temperature control and method of making.

2. Prior Art

The needs in the packaging market are many and varied. Many different designs for packaging are known, to suit many different needs. Notwithstanding the variety of packaging already known, there still exists a need for reasonably priced packaging in the form of a corrugated box that will shield temperature sensitive contents of the box from the environment that will allow the contents to arrive overnight or within a period of a short time and yet remain fresh or frozen or could be kept from freezing. There are currently known designs for packaging that accomplish the foregoing objective, but they are all extremely expensive to ship, complicated in construction and are not economically justifiable for the volume shipment of ordinary perishables or commodities.

SUMMARY OF THE INVENTION

The objective of the invention is achieved by the provision of a novel corrugated box construction utilizing metallized laminates in the construction of the box. A novel box is for shipping temperature sensitive or perishable goods and comprises a container made from a double walled combined web having an inside barrier layer, a first paper liner bonded to said inside barrier layer, a first paper flute medium bonded to the first paper liner, an outside barrier layer, a second paper liner bonded to the outside barrier layer, a second paper flute medium bonded to the second paper liner, and a sandwich of a barrier layer bonded between third and fourth paper liners, said flute mediums bonded, respectively, to the third and fourth paper liners.

The box for shipping temperature sensitive or perishable goods according to the above can further comprise the barrier being composed of metallized plastic film, and in the most preferred form, the metallized plastic film is a polyester film. The bonding of the liners and medium is effected by a water resistant starch.

A box for shipping temperature sensitive or perishable goods according to the above can further comprise a divider for dividing the interior of the box into two compartments. The divider is a flat member made from a double walled combined web like the box. In the most preferred form, the invention consists of a box for shipping temperature sensitive or perishable goods comprising a container made from a double walled combined web having an inside layer of metallized polyester film, a first 57# kraft liner bonded to said inside layer of metallized polyester film, a first 33# flute medium bonded to the first liner, an outside layer of metallized polyester film, a second 57# kraft liner bonded to the outside layer of metallized polyester film, a second 33# flute medium bonded to the second liner, and a sandwich of metallized polyester film bonded between third and fourth 26# kraft liners, said flute mediums bonded, respectively, to the third and fourth liners.

In addition to the article or product, the invention also contemplates a method for making a box comprising the steps of corrugating a first flute medium, adhering the first flute medium to the paper side of a first lamination of paper and a barrier layer, corrugating a second flute medium, adhering the second flute medium to one side of a sandwich of a barrier layer bonded between two paper liners, and adhering the first flute medium to the other side of the sandwich, while adhering the second flute medium to the paper side of a second lamination of paper and barrier layer. The adhering is effected using a water resistant starch. The barrier layer is a metallized plastic film, and preferably a metallized polyester film.

DETAILED DESCRIPTION OF PREFERRED EMBODIMENTS

Figure 1:
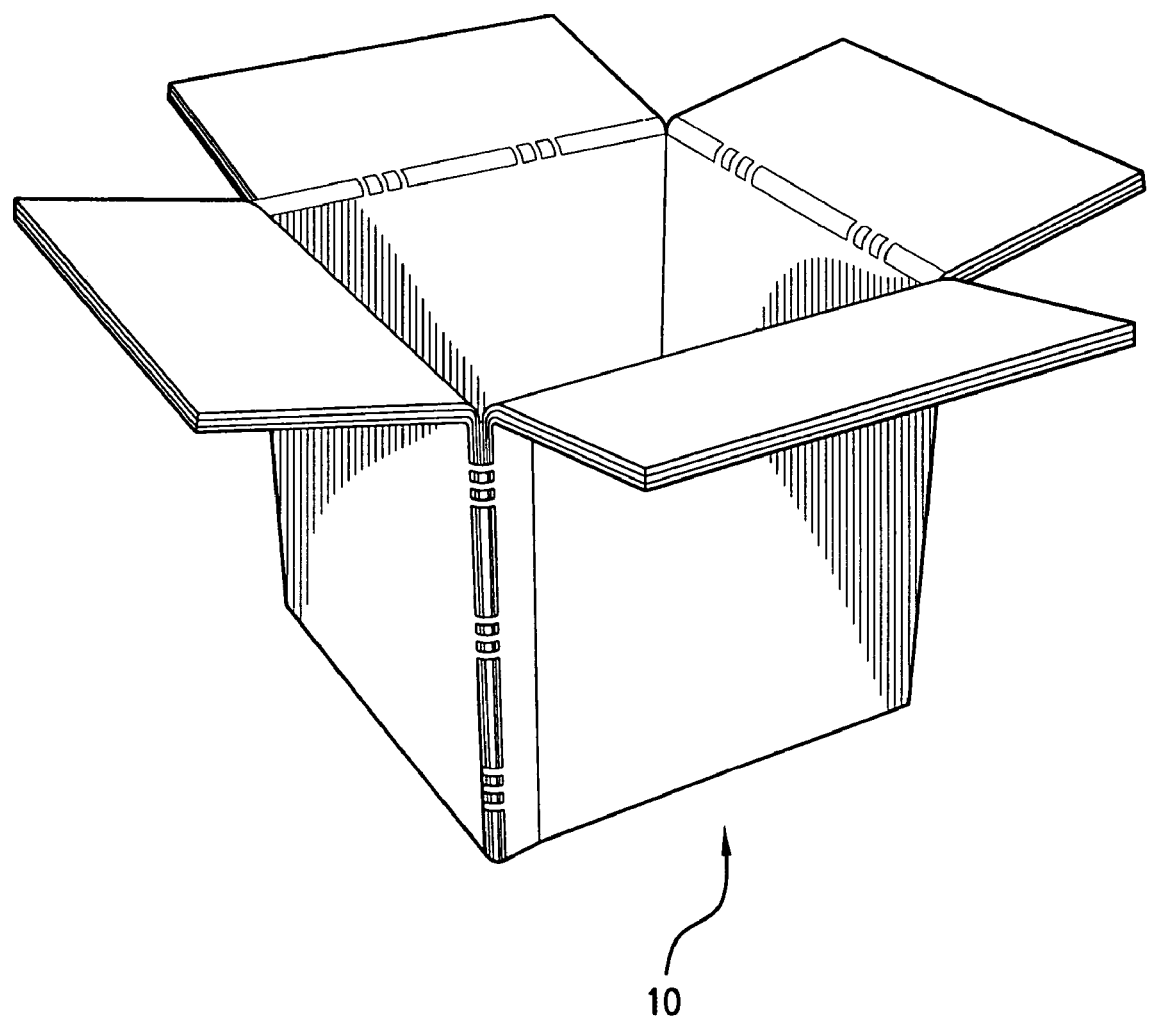
FIG. 1 is a perspective view of the novel box.
Figure 2:
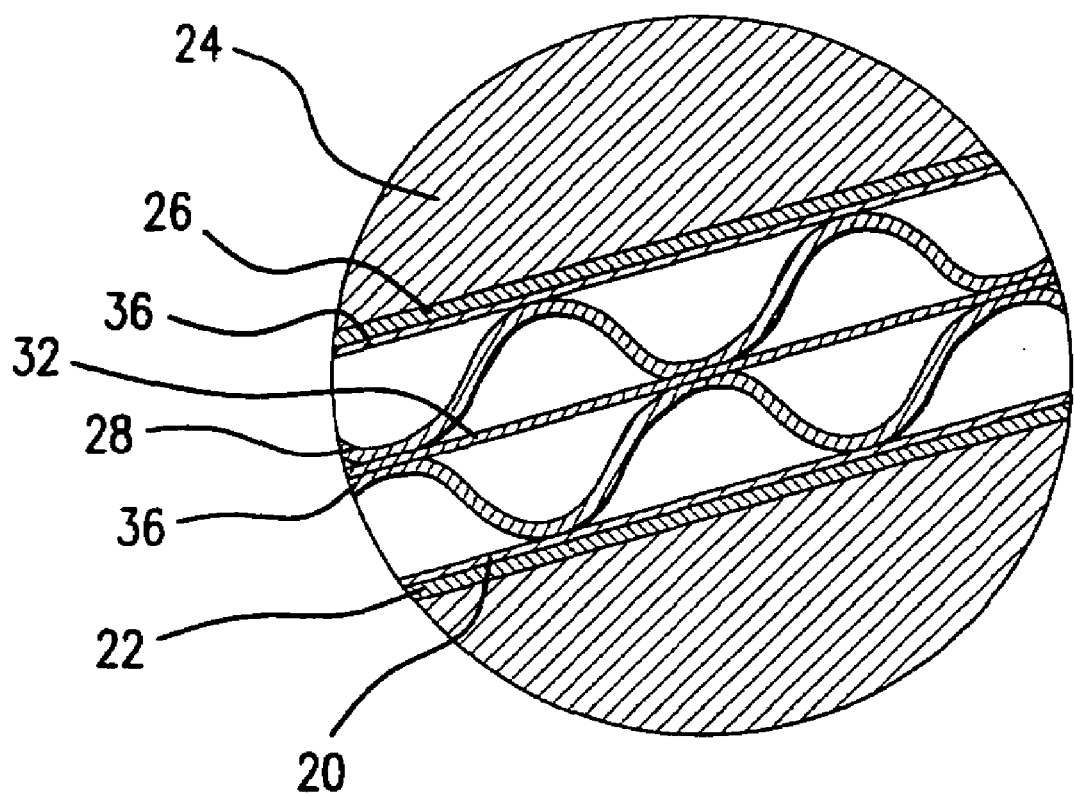
FIG. 2 is a section taken through the box showing the multi-layer construction.
Figure 2:
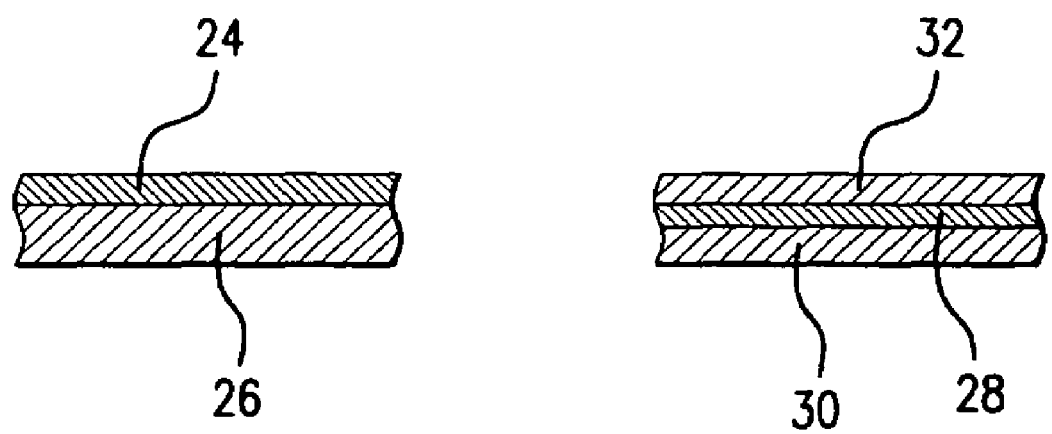
Figure 3:
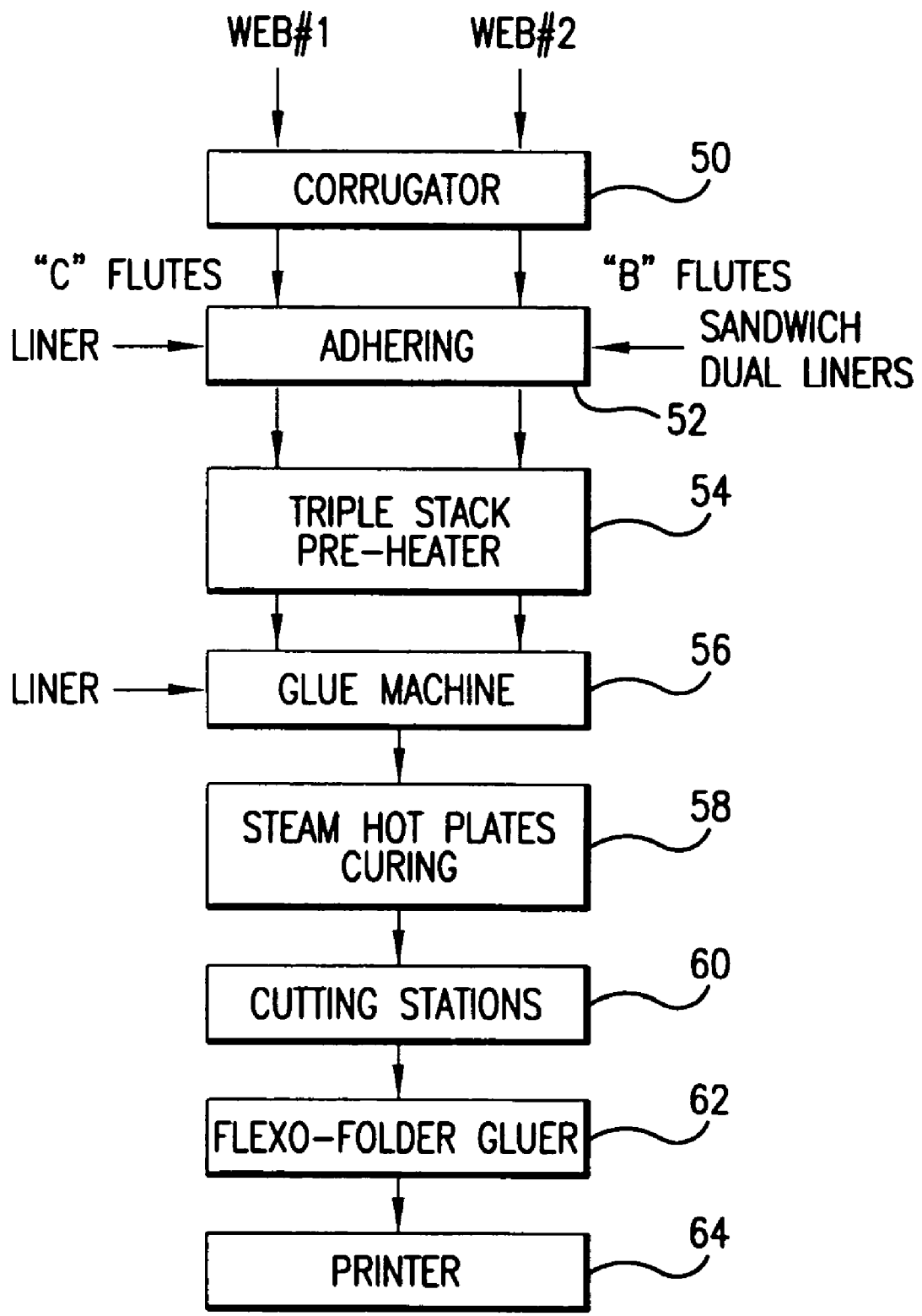
FIG. 3 is a block diagram showing the method of making the box.

Referring now to the drawings, FIGS. 1 and 2 show the preferred embodiment of the novel box 10, which consists of the following double wall construction. An outside layer of metallized polyester film (radiant barrier) 20 is laminated to 57# kraft liner 22, a 33# "B" flute medium 36 is bonded to kraft liner 22, an inside layer of metallized polyester film (radiant barrier) 24 is laminated to 57# kraft liner 26, a 33# "C" flute medium 38 is bonded to kraft liner 26, and a sandwich of metallized polyester film (radiant barrier) 28 is bonded between two 26# kraft liners 30, 32. The kraft liners 30, 32 are bonded, respectively, to the 33# "B" and "C" flute mediums 46, 38.

Whereas the specific weights of the paper and cardboard elements of the construction are given above as being preferred, it will be appreciated that variations in weights of these elements that do not adversely affect the performance of the box for any particular application, will be apparent to those skilled in the art, from the teachings herein, and are deemed to be included within the purview of the invention as claimed. As mentioned, the invention concerns providing a novel box and method for making that includes the steps of corrugating and converting processes for temperature sensitive (protective) corrugated boxes. The object is to provide new product for the packaging industry consisting of a corrugated box of double-wall construction that uses special materials to shield temperature sensitive contents (e.g., perishable goods) from the environment during shipping to allow them to arrive overnight (or longer) remaining fresh.

As noted above the product is made from the following material, in its most preferred form or embodiment. The materials used in the construction of the box are: (a) an inside layer of "metalized" polyester film laminated to 57# kraft liner; (b) a 33# "C" flute medium; (c) a sandwich of "metalized" polyester film bonded between two 26# kraft liners; (d) a 33# "B" flute medium; and (e) an outside layer of "metalized" polyester film laminated to 57# kraft liner. Water resistant starch is used to bond the liners to the mediums.

With the kraft paper used in this box, it will be sufficiently strong to withstand stacking to heights needed via most shipping methods given the weight of the perishable products that will use it.

The temperature protection for the contents comes from two sources. First, the three layers of metalized polyester film (radiant barriers) in the box combined or sandwiched to four liners, provides good barrier to heat transfer from radiation and conduction. The second source comes from two airspaces created between the liners by the fluted mediums forming a barrier resistant to convection.

The process or method to make the boxes 10 starts with the materials listed above and uses a corrugator with two single-facers and a flexo folder-gluer to convert the sheet (to be cut-out in the blanks for the boxes) once it has been corrugated. The operation of the corrugator and the flexo folder-gluer are modified to accommodate the heat-transfer, scuff resistance, tension, moisture, rigidity and other properties of the metallized polyester film liners.

The corrugator process starts by corrugating 50 one of the 33# mediums (web #1) and adhering 52 it to the paper side of one of the 57# liners. The "C" flute web is transported to the triplestack pre-heater 54 for the glue machine 56. At nearly the same time another 33# medium (web #2) is corrugated with "B" flutes and adhered to the sandwiched dual 26# liner plus film. This "B" flute web is also transported to the triple-stack pre-heater 54 for the glue machine 56.

At the glue machine 56, both corrugated webs are preheated and adhered to another 57# liner with film. The double-wall combined web is then cured through a series of steam hot plates 58 and delivered to the cutting stations 60 of the corrugator for trimming to both width and length.

The flexo folder-gluer 62 converts the cut-to-size sheets from the corrugator into optionally printed regular slotted containers (RSC). In order to print 64 on the "metalized" film of the box, the formulation of the ink used must be modified to allow the ink to dry on the surface of the film while retaining correct dimensions without smearing and have the correct color while operating at an acceptable speed.

Additionally, the normal carton glue used to seal the glue flap of the box cannot be used since it does not penetrate the film well enough to give a firm bond. The gluing equipment on the flexo folder-gluer 62 must be modified to allow use of "hot-melt" type adhesives that do bond to the film. Again these changes must be incorporated into the control system that governs position, speed, temperature, etc of the adhesive in relation to the box as it travels through the machine.

The boxes 10 are designed to have an outside glue flap. This allows the truest inside dimensions on the box to be maintained and avoid additional gaps that would allow air and heat into the box. Lastly, the clippings that come from cutting the slots and the glue tab in the box (or from trimming to size at the corrugator) are not recyclable. These become waste that must be transported to a landfill. If sufficient volume of the clipping material is to be discarded, it may be offered to a paper recycler, who may have interest in finding a way to deal with the new material for little additional cost.

By using the metalized polyester films bonded to appropriate liners, a new packaging product and method or process to corrugate and convert boxes is here provided in order to be able to fill packaging market needs heretofore only served at a high cost. By making sufficient modifications to the operating parameters of the corrugator and glue and ink application at the box converting equipment, it is now possible to produce highly effective temperature sensitive packaging to service the existing market at a more attractive total cost.

The box 10 is made as a knockdown box that needs to be erected or assembled with the flaps folded in and taped shut like a regular RSC box. The box 10 has a square cross section, i.e. its length and width are the same. Accordingly, when erected the flaps fold in and are abutting. First one set of opposed flaps are folded in with the other set of opposed flaps folded in over the first set, thereby providing enhance thermal properties.

In addition to the above, the invention contemplates the inclusion in the box of a divider, in order to divide the interior space into two or more compartments that may function to maintain different temperature criteria for different packaged goods. For example, the interior space can be divided into two compartments, at time of loading, using a novel divider consisting of a piece of the double wall combined web that forms the wall construction of the box. The divider is cut to a size slightly larger than the cross section of the box, so that when it is pressed into the box, its perimeter is press fit to the interior wall of the box with no air gaps or spaces that would allow air conduction between the divided compartments. In this manner, the two compartments so formed can be maintained at different temperature constraints.

Each compartment of the box is packed with temperature controlling materials such as phase change materials, in the form of block or bags with the payload being held within the temperature controlling materials, as is generally known.

Although the invention has been described in terms of specific embodiments, changes are possible that do not depart from the teachings herein. Such changes are deemed to come within the scope of the invention as claimed.

What is claimed is:

1. A box for shipping temperature sensitive or perishable goods comprising a wall structure consisting of a double walled combined web having an inside barrier layer composed of metallized plastic film, a first paper liner bonded to said inside barrier layer, a first paper flute medium bonded to the first paper liner, an outside barrier layer composed of metallized plastic film, a second paper liner bonded to the outside barrier layer, a second paper flute medium bonded to the second paper liner, and a sandwich of a barrier layer composed of metallized plastic film bonded between third and fourth paper liners, said flute mediums bonded, respectively, to the third and fourth paper liners.

2. A box for shipping temperature sensitive or perishable goods according to claim 1 wherein the metallized plastic film is a polyester film.

3. A box for shipping temperature sensitive or perishable goods according to claim 1 wherein the bonding being effected by a water resistant starch.

4. A box for shipping temperature sensitive or perishable goods according to claim 1 further comprising a divider for dividing the interior of the box into two compartments comprising a flat member made from a double walled combined web like the box.

5. A box for shipping temperature sensitive or perishable goods comprising a wall structure consisting of a double walled combined web having an inside layer of metallized polyester film, a first 57# kraft liner bonded to said inside layer of metallized polyester film, a first 33# flute medium bonded to the first liner, an outside layer of metallized polyester film, a second 57# kraft liner bonded to the outside layer of metallized polyester film, a second 33# flute medium bonded to the second liner, and a sandwich of metallized polyester film bonded between third and fourth 26# kraft liners, said flute mediums bonded, respectively, to the third and fourth liners.

* * * * *